United States Patent [19]

Chattha et al.

[11] Patent Number: 5,081,092
[45] Date of Patent: Jan. 14, 1992

[54] OXIDATION CATALYST WITH MODIFIED PLATINUM STRUCTURE

[75] Inventors: Mohinder S. Chattha, Northville, Mich.; William L. H. Watkins, Toledo, Ohio; Haren S. Gandhi, Farmington Hills, Mich.

[73] Assignee: Ford Motor Company, Dearborn, Mich.

[21] Appl. No.: 461,965

[22] Filed: Jan. 8, 1990

[51] Int. Cl.$^5$ .............................................. B01J 31/00
[52] U.S. Cl. .................................. 502/159; 502/200; 502/201; 502/230; 502/325; 502/334
[58] Field of Search ............... 502/159, 230, 201, 200, 502/334, 325

[56] References Cited

U.S. PATENT DOCUMENTS

| | | | |
|---|---|---|---|
| 4,098,727 | 7/1978 | Haag et al. | 502/159 |
| 4,179,402 | 12/1979 | Kim et al. | 502/159 |
| 4,179,403 | 12/1979 | Kim et al. | 502/159 |
| 4,274,981 | 6/1981 | Suzuki et al. | 502/200 |
| 4,306,085 | 12/1981 | Kim et al. | 502/159 |
| 4,526,884 | 7/1985 | Tsou et al. | 502/154 |

FOREIGN PATENT DOCUMENTS 2250200 5/1974 Fed. Rep. of Germany .
2204851 9/1987 Japan .

Primary Examiner—Patrick P. Garvin
Assistant Examiner—E. D. Irzinski
Attorney, Agent, or Firm—Joseph W. Malleck; Roger L. May

[57] ABSTRACT

Sacrificial use of amino polymers to modify the crystal structure of platinum derived from chlorine compounds in a method to oxidize hydrocarbons, comprising: (a) preparing a polymer modifier by controllably reacting amine with epoxy resin to form a soluble adduct and adding to the adduct a solvent to form a homogeneous amino polymer solution; (b) coating a granular support material with platinum/chlorine compounds; and (c) mixing the coated support material with the polymer solution and heating the mixture to evaporate the solvent and to decompose and eliminate the polymer, leaving the coated granules with platinum in a morphologically changed condition devoid of amino polymer but having enhanced catalytic effectiveness for promoting oxidation of hydrocarbons. The amine is of a primary or secondary amine, preferably the hydroxyethyl group. The epoxy is a soluble resin comprising two or more epoxide groups per molecule, i.e., dihydric phenol or dihydric alcohol. The polymer modifier is preferably a soluble amino polymer having a molecular weight of 500-50,000 and advantageously is 50% or more by weight of the solution.

13 Claims, 3 Drawing Sheets

OXIDATION CATALYST WITH MODIFIED PLATINUM STRUCTURE

BACKGROUND OF THE INVENTION

1. Technical Field

This invention relates to the art of making platinum catalysts useful in the conversion of hydrocarbons contained within the exhaust stream of an internal combustion engine, and more particularly to the use of amino Polymers for enhancing the conversion efficiency of catalyst metals.

2. Discussion of the Prior Art

Platinum containing chlorine compounds (i.e., chloroplatinic acid, ammonium chloroplatinate, and platinum chloride) have been used in the making of oxidation catalysts for some time. Such materials are economical and are used extensively in commercial fabrication of automotive catalysts. It is known that platinum-amines (along with other metal amines, the metal being of group VIII of the periodic table) tend to be more conversion efficient for oxidizing hydrocarbons. However, such platinum-amines unfortunately must be permanently bonded to the catalyst metal and the resulting polymer bonded catalysts are low temperature materials which cannot be used in the high temperature experienced in automotive applications (see U.S. Pat. Nos. 4,098,727; 4,179,402; 4,179,403; 4,306,085; and 4,526,884).

It would be desirable to obtain the same or better levels of conversion efficiency in a catalyst prepared with the economy of platinum/chloride compounds and without the need for permanent bonding of amine polymers.

SUMMARY OF THE INVENTION

This invention has discovered that sacrificial use of amino polymers will modify the crystal structure of platinum derived from chlorine compounds accompanied by unique enhancement of its conversion efficiency for hydrocarbons.

A method encompassing this discovery for enhancing the catalytic effectiveness of platinum to oxidize hydrocarbons, comprises: (a) preparing an adhesive polymer modifier by controllably reacting amine with epoxy resin to form a soluble adduct (oligomer) and adding to the adduct a solvent to form a homogeneous amino polymer solution; (b) coating a support material with platinum/chlorine and/or platinum/nitrate compounds; and (c) adding the polymer solution to the support material either prior to or subsequent to step (b) and heating the mixture of polymer solution, support material, and platinum compound to evaporate the solvent and to decompose and eliminate the polymer, leaving the coated support material with platinum in a morphologically changed condition devoid of amino polymer but having enhanced catalytic effectiveness for promoting oxidation of hydrocarbons.

Preferably, the amine is of a secondary amine selected from the group including mono-2-hydroxy ethyl amine and advantageously di-2-hydroxyethyl amine. The epoxy resin is preferably a soluble resin comprising two or more epoxide groups per molecule and advantageously is derived from dihydric phenol or dihydric alcohol (molecular weight 200-1000). The resulting polymer modifier is preferably a soluble amino polymer having a molecular weight of 500-50,000 and advantageously is 50% or more by weight of the solution.

The support material is preferably granular and comprises alumina in a mesh size of 20-40. The platinum/chlorine compound is preferably chloroplatinic acid and the platinum nitrate compound is preferably tetramine platinum nitrate.

The polymer modifier and platinum/chlorine compound are employed so that the equivalent weight of the amino moiety (amino functionality) is 0.5-10.0 times the weight of the precious metal. The nitrogen ratio of the polymer is adjusted according to the equivalent amine so that the polymer complexes with the platinum. The platinum is loaded on the alumina granules in an amount of 0.1-5.0% by weight of the entire catalyst, including the alumina.

Preferably, polymer preparation is carried out by adding amine or amine solution by drops accompanied by stirring. Heating is carried out not only to complete the reaction of the epoxy with the amine, preferably by stirring at 50° C. for 1-10 hours, but also heating is carried out to decompose and eliminate the polymer modifier and to stabilize the crystalline structure of the platinum. Such latter heating is preferably carried out in two stages: first by heating to 350° C. for two hours, and thence to 650° C. for 18 hours.

The product resulting from the practice of the above method is a modified platinum composition characterized by (i) a higher conversion efficiency for hydrocarbon oxidation, and (ii) a lower light-off temperature at or above 50% conversion efficiency.

DETAILED DESCRIPTION AND BEST MODE

Figure 1:
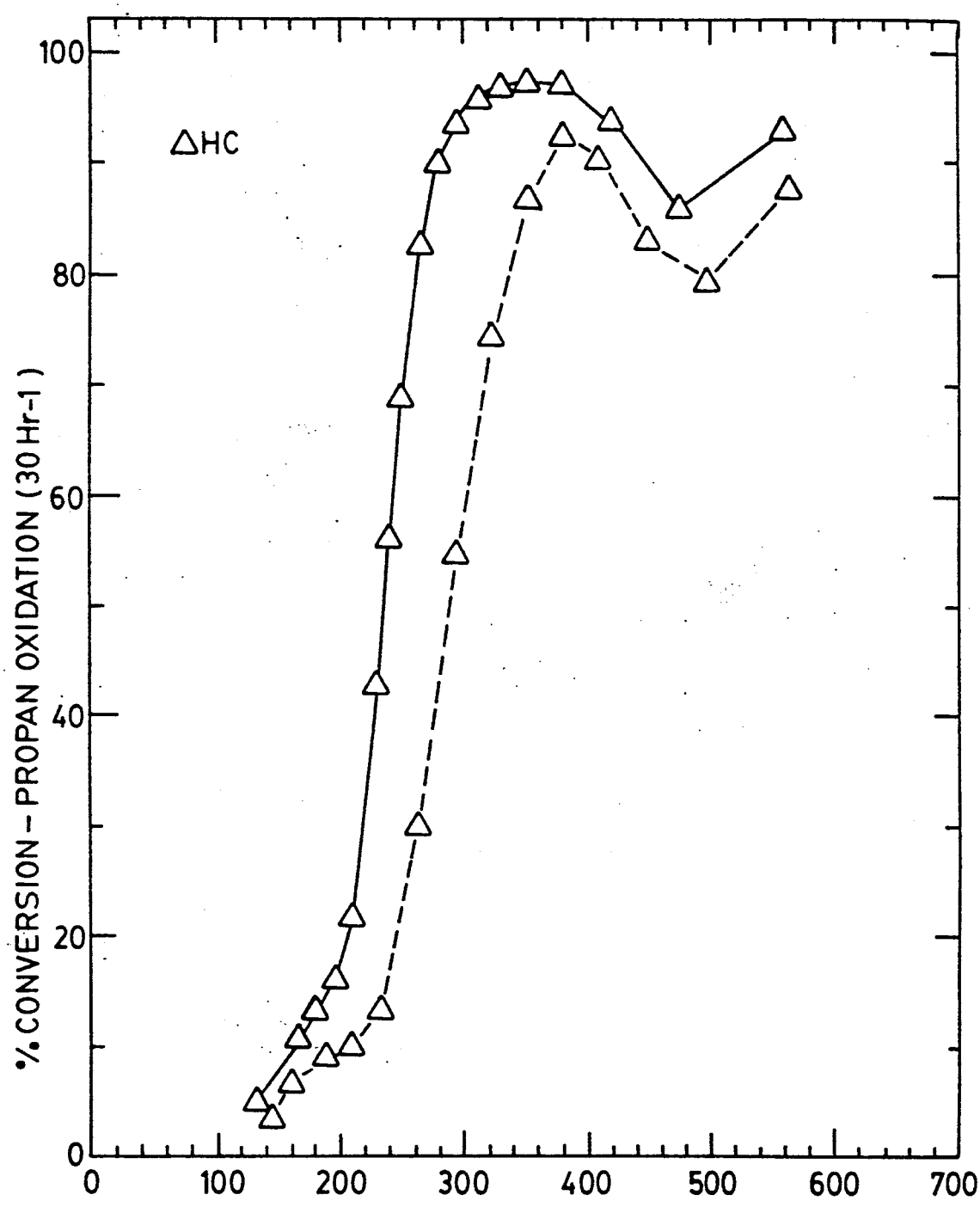
FIG. 1 is a graphical illustration of conversion efficiency of propane as a function of exhaust gas temperature for catalysts prepared in accordance with this invention, the space velocity for the catalyst structure with respect to the exhaust gas was 30 K/hr$^{-1}$.

This invention obtains the same or better levels of conversion efficiency in a catalyst prepared with the economy of platinum/chlorine compounds and without the use of amino Platinum, Precursors resident in the catalyst.

The method of this invention to achieve such enhancement for oxidizing hydrocarbons, comprises: (a) preparing a Polymer modifier by controllably reacting an amine with epoxy resin to form a soluble oligomer and adding to the oligomer a solvent to form a homogeneous amino polymer solution; (b) coating a granular support material with platinum/chlorine compounds; and (c) mixing the coated support material with the amino polymer solution and heating the mixture to evaporate the solvent and thence to decompose and eliminate the amino polymer, leaving the coated granules with the platinum in a morphologically changed condition devoid of amino polymer with an enhanced catalytic effectiveness for promoting oxidation of hydrocarbons.

The polymer preferably is derived from organic epoxy resins which have two epoxide groups per molecule. The epoxy resin is preferably selected of either dihydric phenol or dihydric alcohol. A large number of these polyepoxide resins are known to those skilled in the art. Examples of such polyepoxide resins are those derived from a dihydric phenol or dihydric alcohol and an epihalohydrin. Examples of the latter are epichlorohydrin, epibromohydrin, and epiiodohydrin. Dihydric phenols and dihydric alcohols are exemplified by resourcinol, hydroquinone, Bisphenol A, p, p'-dihydroxy, benzophenone, p, p'-dihydroxybiphenyl, p, p'-dihydroxy diphenyl ethane, bis-(2-hydroxy naphthyl methane}, 1, 5-dihydroxy naphthaline, ethylene glycol, propylene glycol, 1, 4-butane diol, hydrogenated Bisphenol A, 1, 4-cyclohexane diol, 1, 3-cyclopentane diol, cyclohexane dimethanol, and the like. These polyepoxide resins, as is well known in the art, are made in the desired molecular weights by reacting the epihalohydrin and the diols in various ratios, or by reacting a dihydric phenol with a lower molecular weight polyepoxide resin. Other polyepoxide resins are glycidyl polyethers of Bisphenol A, phenol-formaldehyde, melamine-formaldehyde, urea-formaldehyde, polyalkylene-formaldehyde, and polystyrene resins.

The amine functional group to be contained by the polymer are tertiary amines which may include mono, di, or tri-2-hydroxyethylamine groups. The nitrogen atom in these amine groups may be substituted with aromatic or aliphatic groups. Tertiary amine groups containing at least one, two, or three 2-hydroxyalkyl groups are preferred.

The amine and epoxy resin are reacted in a controllable manner such as by use of drops to control the exothermic reaction therebetween. The reaction mixture is then heated at a temperature of about 60° C. for several hours to homogenize the reaction product, and then a solvent, such as ethanol or acetone, in an amount of about 50% is added. This solution is then heated to obtain a homogeneous solution, such as by heating to a temperature of 50°-100° C. for about 1-4 hours.

Amine and epoxy solutions are also reacted together in an appropriate solvent in the desired concentrations.

The preferred polymer system containing the functional group of tertiary amines has the general formula as below:

exterior dimensions. It is preferred that the micropore volume of the silicate material be relatively low and the macropore volume provide at least about 90% with pore diameters greater than 2000 angstroms. The surface area of the carrier, as opposed to the material of which the structure is made, should be maximized consistent with pressure drop limitatioans for the particular application of the catalytic system of this invention. It is preferred that the surface area of the monolithic structure provide 50-1000 m$^2$ per liter of structure, as measured by N$_2$ adsorption. Cell density should be maximized consistent with Pressure drop limitations and is preferably in the range of 200-800 cells per square inch of cross-sectional area of the structure.

Alumina must be the dominant or substantial ingredient of the support (at least 50% by weight) because it has high surface area, good adhesion, and low precious metal/support chemical interaction.

The platinum compounds can be chloroplatinic acid, ammonium chloroplatinate, platinum chlorides, and aminoplatinum compounds. Coating of the granular material is carried out by impregnating it with an acidic aqueous solution of the platinum compound to impart 0.1-5% of platinum on the support. The support material such as gamma alumina is in the range of 20-40 mesh (although particle size is not critical). The coatings may be put directly of a monolith coated with alumina. The mixture of granular material and acid solution is then stirred continuously at a temperature of about 75°-120° C. to evaporate the solvent.

The last essential step is carried out by mixing in a predetermined proportion the polymer modifier with the platinum coated granules. Such Proportion should be in the range of 0.5-10.0 by weight of modifier to the platinum metal. The proper proportioning will depend in some Part upon whether the polymer modifier is of a long chain or short chain. Essentially, the equivalent weight of the amino moiety (amino functionality) should be 0.5-10.0 times the weight of the platinum. The nitrogen ratio of the polymer is adjusted or employed according to the equivalent resulting weight of the tertiary amine in the resulting reaction of the epoxy and amine. The amino moiety is one that will complex with the platinum.

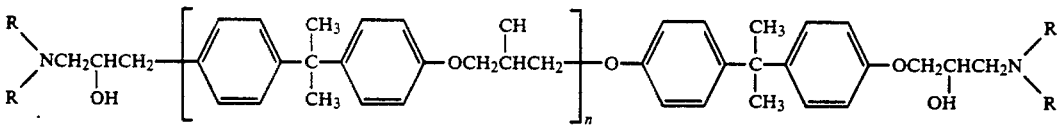

R =alkyl, 2-hydroxyethyl, or aromatic.

The support material, which is preferably alumina, or any of the other materials such as silica, titania, or zirconia, is coated with platinum/chloride compounds. Such support may contain alkaline or rare earth oxides. "Support" is used herein to mean a material having a high surface area per unit volume and a good adhesion for precious metal applied thereto; "carrier" is used herein to mean a material having a low surface area per unit volume and a poor adhesion to precious metals if applied thereto; "catalyst" or "catalyst construction" is used herein to mean the aggregation of support and catalytic compound excluding the carrier. A mechanical carrier is preferably comprised of a monolithic silicate structure (i.e., cordierite), although the configuration of which is not critical to the catalyst of this invention. The volume of the structure is measured by its Up to 49% Pd (by weight of the catalyst) or up to 2-5% base metals, such as W or Ni, etc., may be substituted for the Pt. The catalyst may be an amino platinum based composition with a different type of improved result; such composition may be tetramine platinum nitrate [(NH$_3$)$_4$Pt(NO$_3$)$_2$].

The polymer may be deposited before or after deposition of the precious metal catalyst.

The mixture is stirred at 50°-100° C. to evaporate the ethanol. Then the mixture is heated to decompose and eliminate the polymer modifier from the mixture, such as by heating to 350° C. for about two hours and thence at 650° C. for 18 hours.

The product resulting from the practice of such method is amino polymer modified platinum, a composition characterized by (i) a higher conversion efficiency for hydrocarbons, particularly ethane and propane, which is at least 10-20% greater than that for a nonmodified platinum composition, and (ii) a lower light-off temperature for the platinum catalyst (at about 50% efficiency) which is at a temperature of 10°-100° C. lower than the unmodified catalyst.

Figure 2:
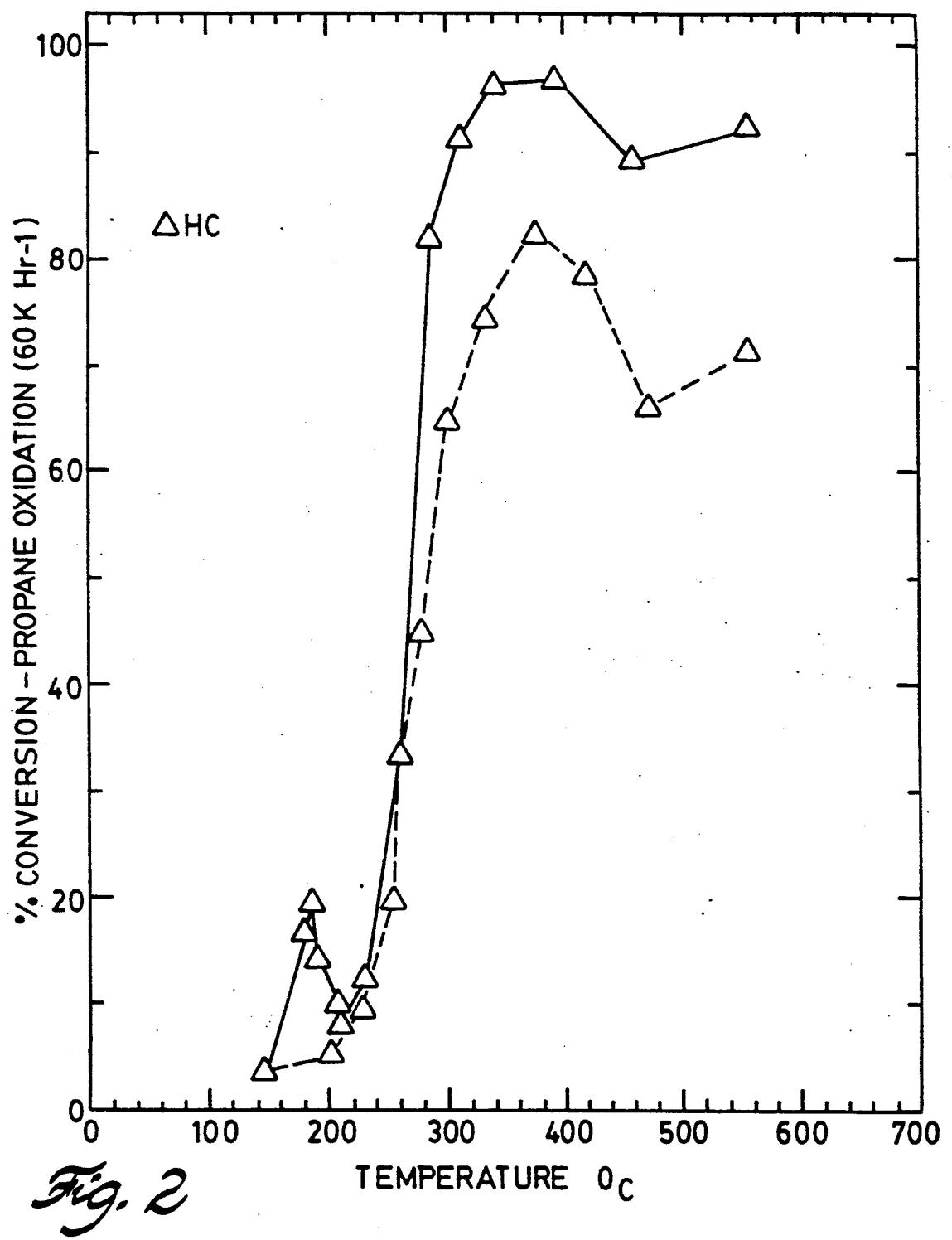
FIG. 2 is a graphical illustration similar to FIG. 1, but the catalyst being operated at a higher space velocity.
Figure 3:
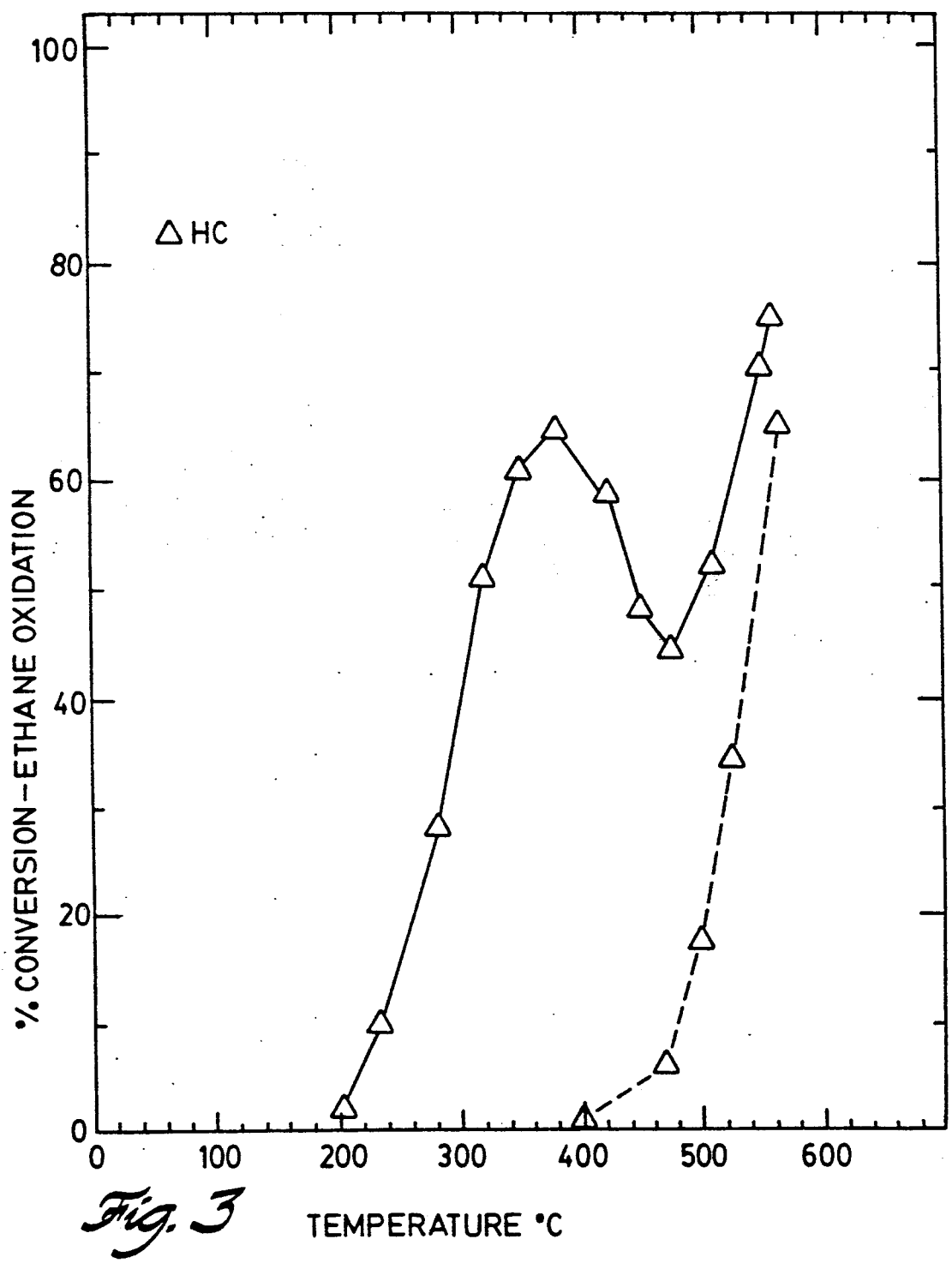
FIG. 3 is a graphical illustration similar to FIG. 1, but for conversion efficiency of ethane as a function of exhaust gas temperature.

To test the effectiveness of the modified catalyst of this invention, catalysts with and without the features of this invention were tested in a flow reactor for propane oxidation and ethane oxidation, as shown in FIGS. 1-3. The synthesized exhaust gas contained 20 ppm $SO_2$ and 500 ppm propane for FIGS. 1 and 2, along with 2% oxygen. The catalysts were tested at a space velocity of 30 K $hr^{-1}$ for FIG. 1 and at 60 K $hr^{-1}$ for FIG. 2. The amount of platinum loading on the support was 0.2 grams in each case, whether with the polymer modification or without the polymer modification of the platinum. The amount of platinum was 1% of the combined weight of the catalyst and the platinum in each case. The catalyst was heated to 650° C. for about 18 hours prior to being utilized in exhaust gas tests.

As shown in FIG. 1, the polymer modified platinum had a maximum conversion efficiency of about 97% which is about 6% greater than that achieved without the modification at the indicated space velocity. The light-off temperature (at 50% conversion efficiency) was considerably reduced by us of the polymer modified platinum from about 300° C. to 250° C.

As shown in FIG. 2, when the catalyst was operated at a space velocity of 60 K $hr^{-1}$, the maximum conversion efficiency was increased from 83% to 97% in comparison with the nonuse of the polymer modification. The light-off temperature (at 50% conversion efficiency) was reduced from 280° to 260° C.

Ethane conversion efficiency was also substantially enhanced, particularly at much lower temperatures, as shown in FIG. 3, throughout the entire range of conversion. Much of this enhancement is believed to be due to the change in crystalline structure of the platinum metal. Since the polymer has strong adhesion to the surface of the alumina because of the hydroxyl group, and because of the strong complexing with platinum due to the amino and hydroxy groups, the solidification dynamics during the making of the crystals is modified. Only certain of the amino complexes will work in this manner. Complexing agents that fail to provide adhesion or binding during calcination between the alumina and precious metal will not function in accordance with this invention. The resulting modified platinum material is considered a new intermediate composition matter particularly useful in high temperature catalyst conversion environments.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

What is claimed:

1. A method of enhancing the catalytic effectiveness of platinum to oxidize hydrocarbons by sacrificial use of polymers, comprising:

(a) preparing a highly adhesive polymer modifier by controllably reacting hydroxy amine with epoxy resin to form a soluble adduct and adding to the adduct a solvent to form a homogeneous amino polymer solution;

(b) coating a support material with platinum/chlorine and/or platinum/nitrate compounds, the dominant or substantial ingredient of said support material being alumina; and (c) adding the polymer modifier solution to the support material either prior to or subsequent to step (b) and heating such mixture of polymer solution, support material, and platinum compound to evaporate the solvent and decompose and eliminate the polymer modifier, leaving the coated granules with platinum in a morphologically changed condition devoid of the polymer modifier with enhanced catalytic effectiveness for promoting oxidation of hydrocarbons.

2. The method as in claim 1, in which said amine is a primary or a secondary amine.

3. The method as in claim 1, in which said epoxy resin is a soluble oligomer having two or more epoxide groups per molecule.

4. The method as in claim 3, in which said epoxy resin is selected from the group derived from dihydric phenol and dihydric alcohol.

5. The method as in claim 1, in which said epoxy resin has a molecular weight of 200-1000 and the polymer modifier has a molecular weight of 500-50,000.

6. The method as in claim 1, in which said polymer modifier in solution constitutes at least 50% of said solution.

7. The method as in claim 1, in which said support material is gamma alumina having a particle size mesh of about 20-40.

8. The method as in claim 1, in which said platinum/chlorine compound is selected from the group consisting of chloroplatinic acid, ammonium chloroplatinate, and platinum chlorides.

9. The method as in claim 1, in which said polymer modifier is mixed or added to said platinum/chlorine solution in a predetermined ratio of 0.5-10.0 times the weight of the platinum metal.

10. The method as in claim 1, in which said platinum is loaded on said support material in an amount of 0.1-5.0% by weight of the entire catalyst, including said support.

11. The method as in claim 1, in which said heating in step (c) to evaporate the solvent includes heating to a temperature of about 75°-120° C. for 2-5 hours.

12. The method as in claim 1, in which said heating in step (c) to decompose and stabilize consists preferably of heating to 350° C. for about two hours, and thence to 650° C. for about 18 hours.

13. The product resulting from the practice of claim 1, which is characterized by an amino polymer modified platinum composition having (i) a higher conversion efficiency for hydrocarbons which is at least 10-20% greater than that for a nonmodified platinum catalyst, and (ii) a lower light-off temperature at or above 50% conversion efficiency which is at a temperature of 10°-100° C. lower than the unmodified platinum catalyst.

* * * * *